United States Patent [19]

Mori

[11] Patent Number: 5,522,500
[45] Date of Patent: Jun. 4, 1996

[54] CASE FOR DISK-TYPE RECORDING MEDIUM

[76] Inventor: Takanori Mori, 22-12, Igusa 3-chome, Suginami-ku, Tokyo-to, Japan

[21] Appl. No.: 155,080

[22] Filed: Nov. 19, 1993

[30] Foreign Application Priority Data

Nov. 20, 1992 [JP] Japan ................ 4-085889 U
Apr. 7, 1993 [JP] Japan ................ 5-022865 U
May 17, 1993 [JP] Japan ................ 5-030644 U

[51] Int. Cl.⁶ .................................................. B65D 85/57
[52] U.S. Cl. ............................... 206/308.1; 206/308.2
[58] Field of Search ............................... 206/307, 309, 206/310, 311, 312, 313, 425, 450, 472, 473, 444, 307.1, 308.1, 308.2, 308.3

[56] References Cited

U.S. PATENT DOCUMENTS

| | | | |
|---|---|---|---|
| 646,638 | 4/1900 | Cutler | 229/928 X |
| 2,333,798 | 11/1943 | Kner | 206/313 X |
| 3,063,619 | 11/1962 | Rhoten | 206/312 X |
| 4,015,350 | 4/1977 | Zurwelle . | |
| 4,453,631 | 6/1984 | Mark | 206/313 |
| 4,470,083 | 9/1984 | Doering et al. . | |
| 4,497,009 | 1/1985 | Oishi et al. . | |
| 4,536,812 | 8/1985 | Oishi et al. . | |
| 4,700,839 | 10/1987 | Fujii . | |
| 4,730,727 | 3/1988 | Petroff | 206/311 |
| 4,762,225 | 8/1988 | Henkel | 206/311 |
| 5,040,167 | 8/1991 | Tanaka et al. . | |
| 5,268,808 | 12/1993 | Childers . | |
| 5,271,502 | 12/1993 | Chang | 206/425 |

FOREIGN PATENT DOCUMENTS 520518 11/1938 European Pat. Off. .
686334 6/1950 European Pat. Off. .

*Primary Examiner*—Jacob K. Ackun
*Attorney, Agent, or Firm*—Testa, Hurwitz & Thibeault

[57] ABSTRACT

A case for receiving disk-type recording medium made of paper and has a receiving chamber in which the disk-type recording medium is stored, the receiving chamber having a pair of walls faced to each other and each having a shape of bellows, a stopper is formed at a part of the receiving chamber, its lids or bottom, so that the disk-type recording medium is held in valleys of the bellows and by the stopper stably in a floated condition. This case can be used as an inner case to be inserted in an outer case.

3 Claims, 25 Drawing Sheets

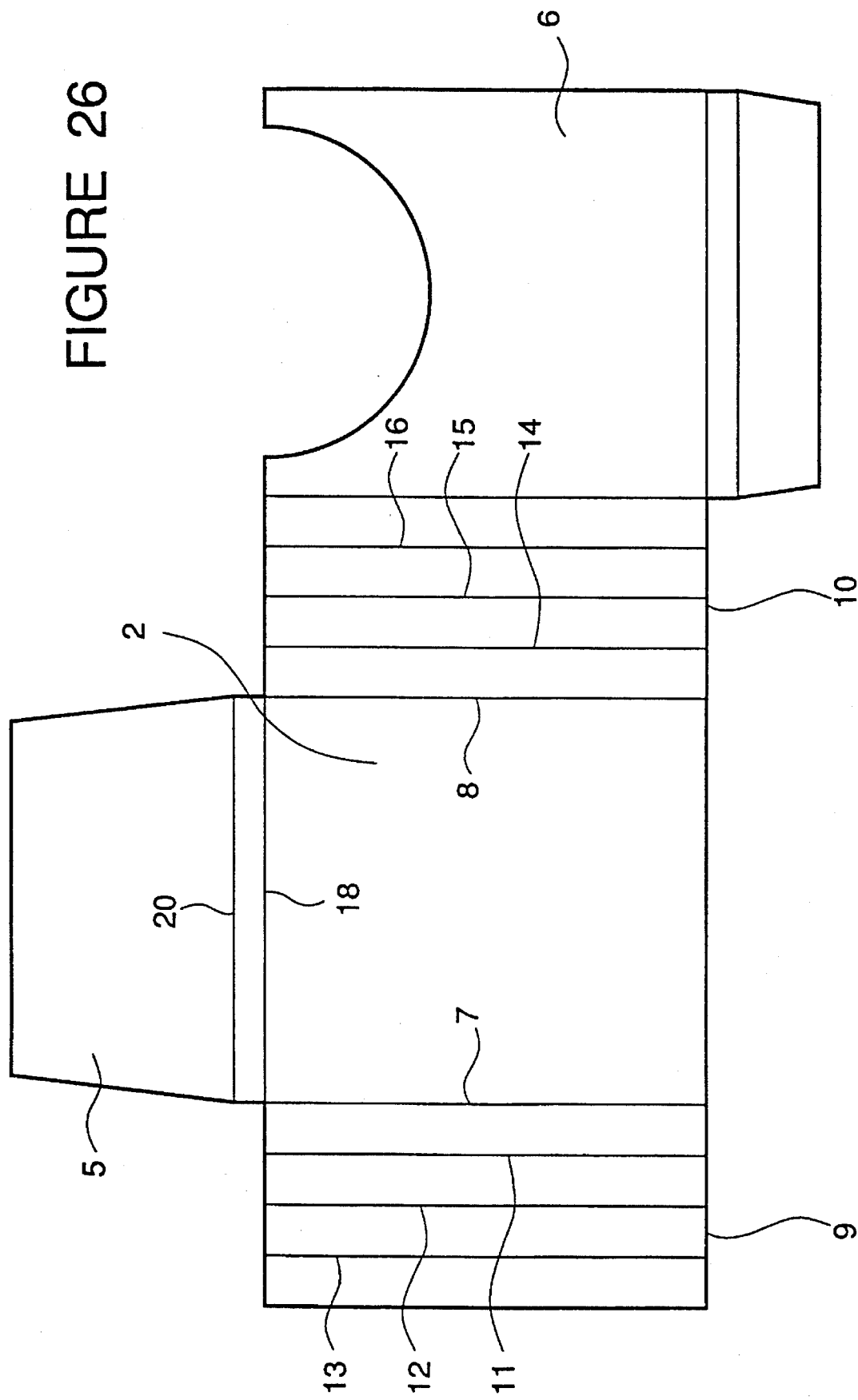

CASE FOR DISK-TYPE RECORDING MEDIUM

BACKGROUND OF THE INVENTION

1. Field of the Invention

The present invention relates to a case for disk-type recording medium or media.

2. Description of the Related Art

Heretofore, disk-type recording medium such as an optical disk including compact disk (CD), video disk (LCD) and micro compact disk (MCD) and floppy disk is stored mainly in a plastic case.

The conventional plastic case, however, is produced by sophisticated molding machine which requires costly mold assembly. Much serious problem which has been taken up recently in plastic case is its potential problem of pollution in environment caused by their waste or disposal. In fact, plastic cases produce toxic gas when they are incinerated and are difficult to be decomposed in earth so that their disposal is not easy.

Material of the disk case may be changed from plastic to paper. However, simple change in material from plastic to paper is not satisfactory and may cause damage of the recording medium. In fact, if the conventional CD case is changed only in material from plastic to paper without modifying its dimensions, a compact disk received in such a case moves excessively due to unnecessary large space of the conventional plastic case.

SUMMARY OF THE INVENTION

An object of the present invention is to solve the problems of know disk cases and to provides an ecological disk case which can be disposed without any trouble and can be manufactured easily at a reduced cost.

The present invention provides a case for receiving disk-type recording medium, made of paper and has a receiving chamber in which the disk-type recording medium is stored, the receiving chamber having a pair of walls faced to each other and each having a shape of bellows so that the disk-type recording medium is held in valleys of the bellows in a floated condition.

The case for receiving disk-type recording medium according to the present invention can have a stopper which is formed by a portion of an upper surface or a bottom surface of the receiving chamber which is turned inwards, so that a disk-type recording medium held by the bellows is abutted, at one edge, to the stopper and is held stably. The stopper may be a separate part made of paper inserted in the receiving chamber.

According to the present invention, the above-mentioned case can be used as an inner case which can be inserted in an outer case.

BRIEF DESCRIPTION OF THE DRAWINGS

FIGS. 25 and 26 illustrate another variation of the present invention.

DETAILED DESCRIPTION OF PREFERRED EMBODIMENTS

Figure 1:
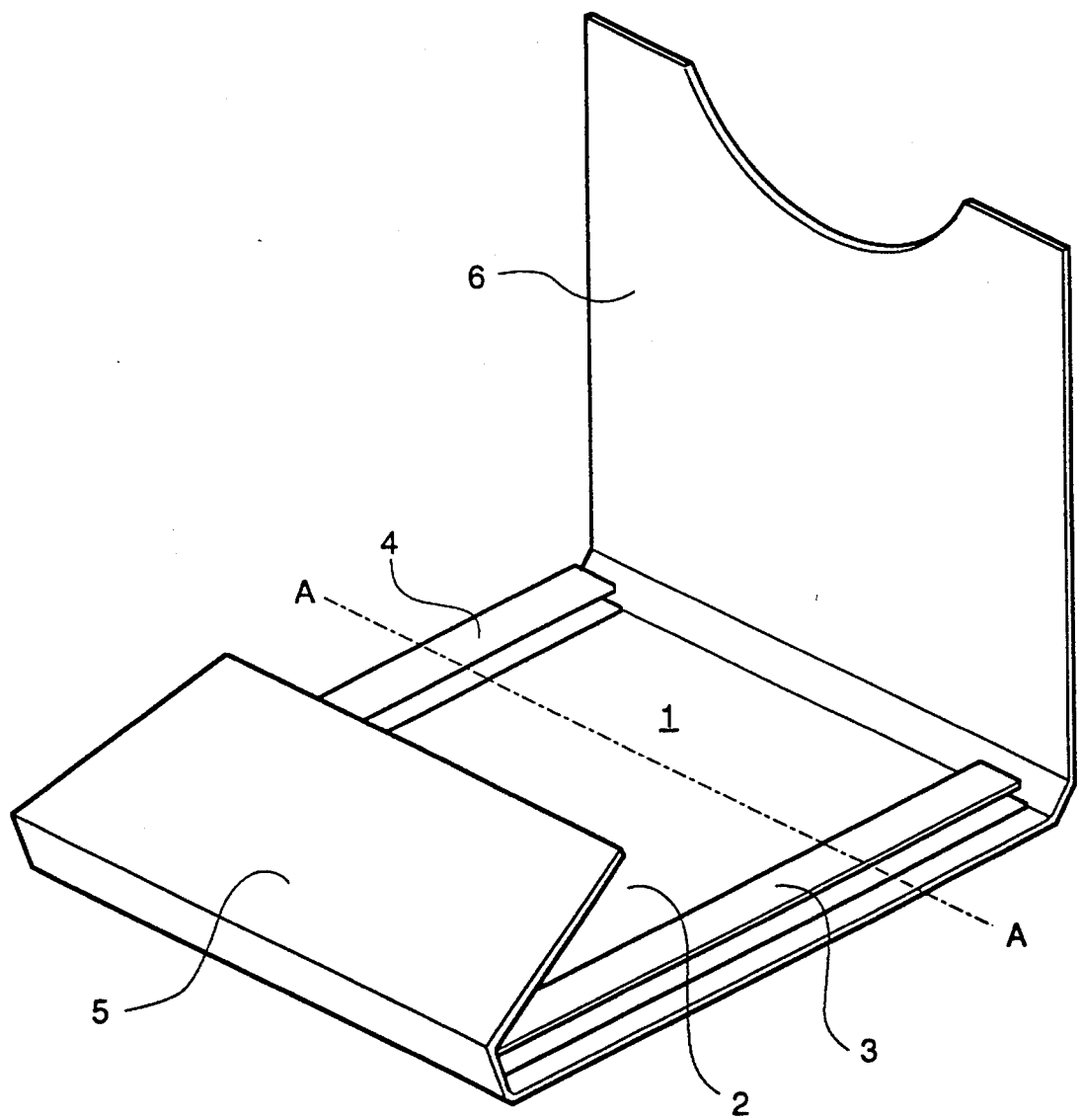
FIG. 1 illustrates a perspective view of first embodiment of a case for receiving a disk-type recording medium according to the present invention.

A case for receiving a disk-type recording medium according to the present invention can be made from a punched sheet of paper which has a disk receiving surface for receiving a disk-type recording medium at the central portion of the sheet, for example. A pair of wings extend at opposite sides of the disk receiving surface and a turn-up portion extends from one of remaining sides. The wings are folded alternately to form a pair of bellows for supporting a disk-type recording medium. The turn-up portion is also folded to provide a lid which covers an upper part of the disk receiving chamber. The disk-type recording medium is clamped in valleys (edges) of the bellows in a floated condition and is supported stably by elasticity of the bellows. The bellows can resist to external three dimensional forces and hence the recording medium can be protected from damage and deformation.

As stated above, a stopper can be formed by folding inwards a portion of an upper surface or a bottom surface of the receiving chamber. A variety of folding methods can be used to realize the stopper. For example, a portion of an upper surface or a bottom surface of the receiving chamber is simply folded inwards, or two parts of a portion of the upper surface or the bottom surface are folded inwards to form a stopper, or a portion of the upper surface is folded inwards and the resulting folded part is further folded so that a secondly folded part contacts with the bottom surface. In all cases, the disk-type recording medium held by the bellows abuts to the stopper and is held stably.

In a variation, two turn-up portions can extend from the remaining opposite sides of the disk receiving surface. In this case, one of the turn-up portions provides an upper surface which covers the disk receiving chamber, while another turn-up portion is used as a lid which closes an inlet of the disk-type recording medium and covers the upper surface. The upper surface can be bonded to the bellows with adhesive. The lid can have a tongue which is intended to be inserted into a slit formed on the upper surface so as to seal the disk receiving chamber. A stopper can be formed on the lid.

According to the present invention, the above-mentioned case can be used as an inner case which is then inserted in an outer case.

According to the present invention, the case for receiving disk-type recording medium can be made by a combination of an inner case and an outer case for receiving the inner case therein. In this case, the inner case is prepared from a punched sheet having a central portion, side wings extending left and right from the central portion and a turn-up portion extending longitudinally from the other side of the central portion. Each of side wings is folded alternately for several times at a plurality of creases to form bellows while the turn-up portion is folded so as to cover the bellows. A stopper is turn up inwards into the inner case, so that an edge of a recording medium inserted in the bellows is abutted to the stopper and hence is prevented from moving freely but is held stably.

The disk-type recording medium can be optical disks such as compact disk and video disk. The present invention is applicable preferably to compact disks (CD, CD-I, CD-V etc). The case according to the present invention can be made from a sheet of paper including thick paper, cardboard, carton and laminated sheets with and without printing.

Figure 2:
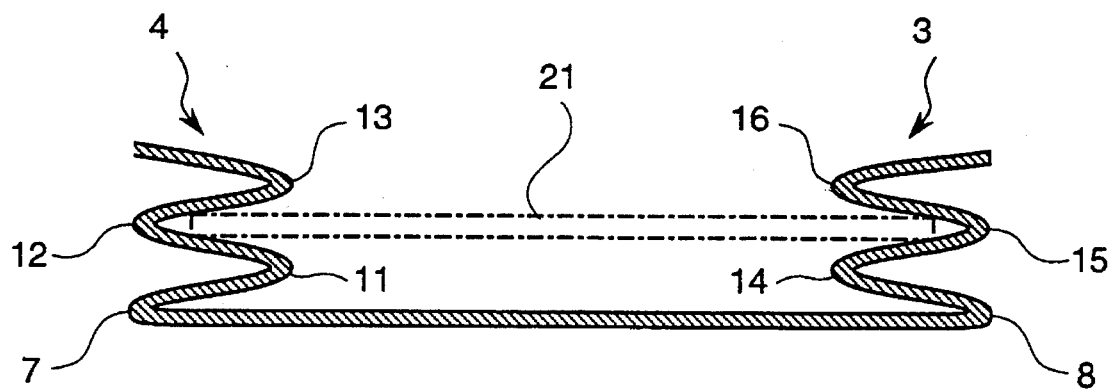
FIG. 2 is a cross section along A—A line in FIG. 1.

Numbers of folds of the bellows are not limited. In a preferred embodiment, a leaflet describing the contents recorded in the recording medium or advertisement is inserted in the bottom valley of the bellows and a disk-type recording medium is inserted in next valley (edge) so that disk-type recording medium is clamped and held stably in a floated condition three-dimensionally by elasticity of the bellows. Preferably, a valley for receiving a disk is provided by the bellows as is shown in FIG. 2 so as to increase remarkably the strength of the disk case and to protect the recording medium.

Now, several examples of the present invention will be described with referring to attached drawings but the present invention should not be limited to those embodiments.

EXAMPLE 1

FIG. 1 illustrates a disk case which is a first embodiment of the present invention. This disk case has a disk receiving chamber 1 for receiving a disk-type recording medium. The disk receiving chamber 1 has a rectangular disk receiving surface 2 whose opposite two sides (left and right sides in FIG. 1) are delimited by a pair of side supports 3, 4 each having a shape of bellows and whose remaining opposite two sides (upper and lower sides in FIG. 1) are delimited by two lids 5, 6 each intended to cover the disk receiving chamber 1. All of these portions are made from a sheet of soft paper integrally.

Figure 3:
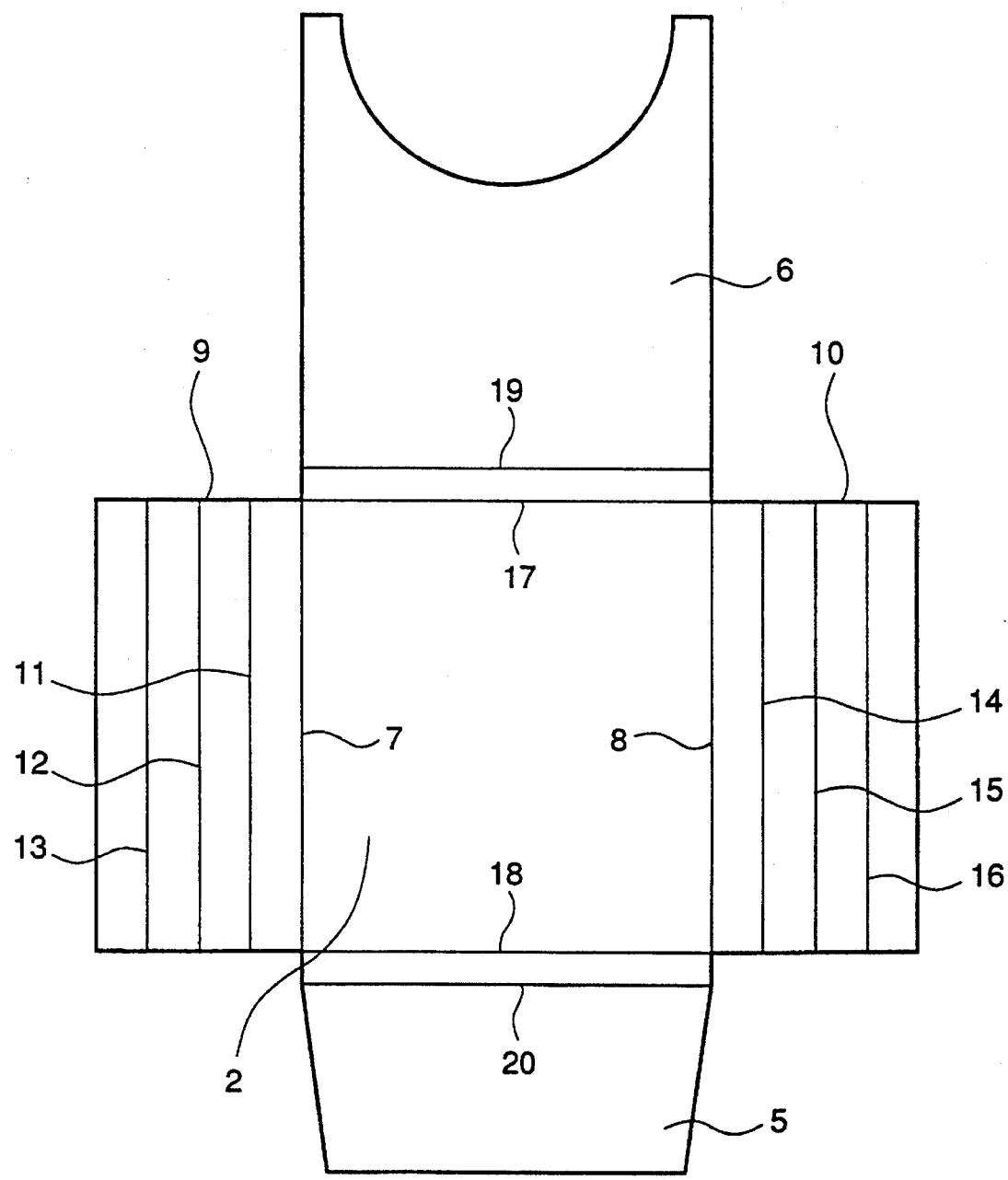
FIG. 3 is a development of the case shown in FIG. 1.

FIG. 3 shows a development of a sheet of soft paper from which the disk case of FIG. 1 is made. This sheet has a rectangular disk receiving surface 2 at the center, a pair of side wings 9, 10 extending from opposite sides 7, 8 (left and right sides in FIG. 3) of the disk receiving surface 2, and two lids 5, 6 extending from remaining opposite sides 17, 18 (upper and lower sides in FIG. 3) of the disk receiving surface 2. Each wing 9, 10 has three creases 11 to 13 and 14 to 16 which are folded alternately to form a disk supporting bellows 3, 4 consisting of valley 7, 8, ridge 11, 14, valley 12, 15 and ridge 13, 16. Each lid 5, 6 has two creases 17, 18 and 19, 20 which are folded up towards the disk supporting surface 2 so that two lids 5 and 6 cover the disk receiving chamber 1.

The thickness of the disk case is determined by the positions of the creases 19, 20 which can be selected freely according to the height of the disk supporting bellows 3, 4 and thickness of the disk case requested.

FIG. 2 is an illustration of a cross section along a line of A—A in FIG. 1. As is shown in FIG. 2, a disk-type recording medium 21 is inserted into opposite valleys of the disk supporting bellows 3, 4 and is clamped or held between opposite side surface of the ridges, so that the disk-type recording medium 21 is supported in a floated condition except clamping surfaces in the case.

In this embodiment, one of the lids 5 and 6 can be connected to top surfaces of the disk supporting bellows 3, 4 to form a box type case having an opening. In anther variation, one of the lids 5 and 6 has a tongue intended to be inserted into a slit or the other engaging means formed on another lid.

EXAMPLE 2

Figure 4:
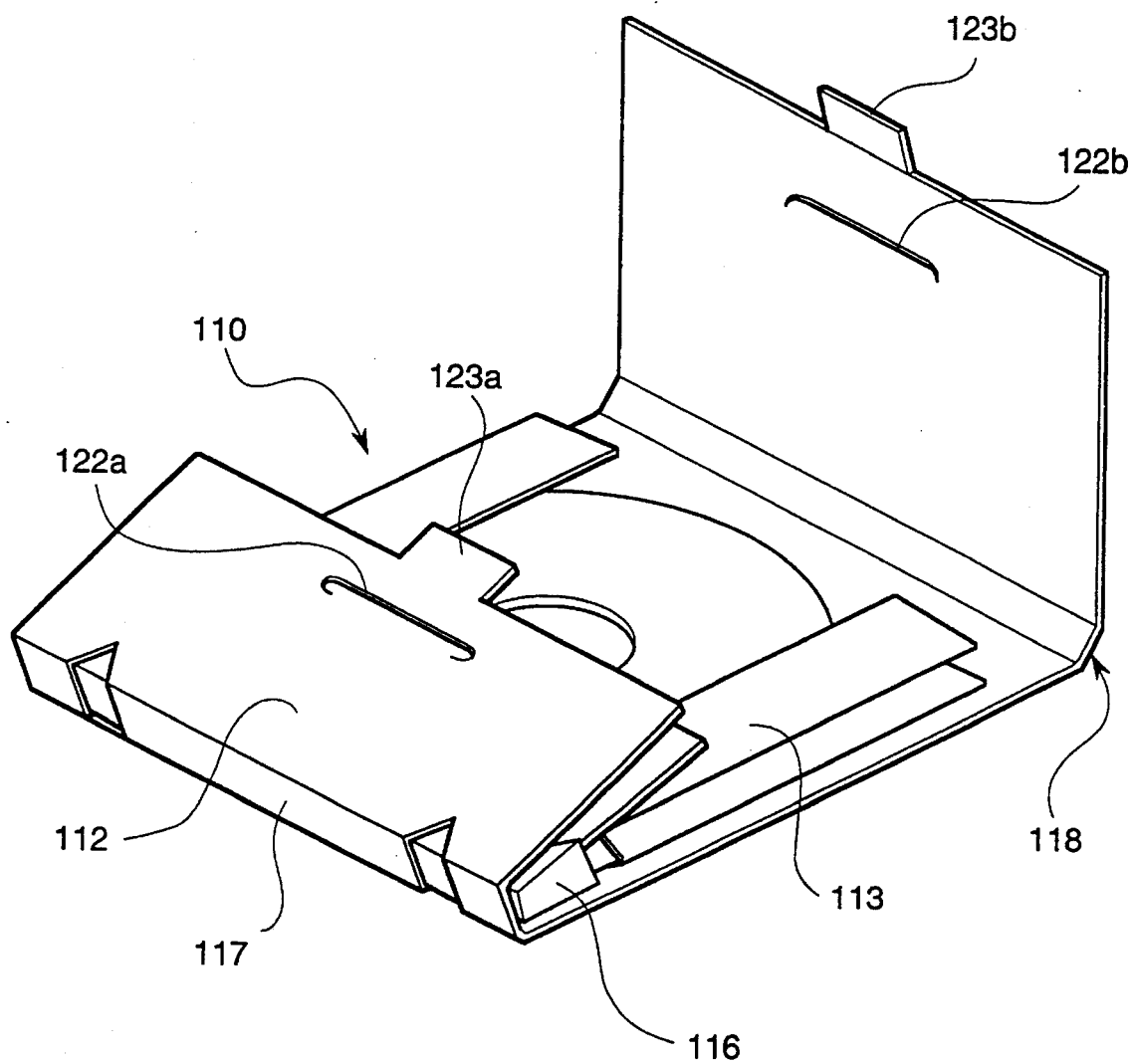
FIG. 4 is an illustrative perspective view of second embodiment of a case for receiving disk-type recording medium according to the present invention.

FIG. 4 is an illustrative perspective view of second embodiment of a case for receiving disk-type recording medium according to the present invention. This case 110 for receiving disk-type recording medium is a boxy type case for storing a disk-type recording medium 111 in a sealed condition and can be made mainly from thick paper or plastic sheet. This case 110 consists of an outer case 112 and an inner case 113 to be received in the outer case 112.

Figure 5:
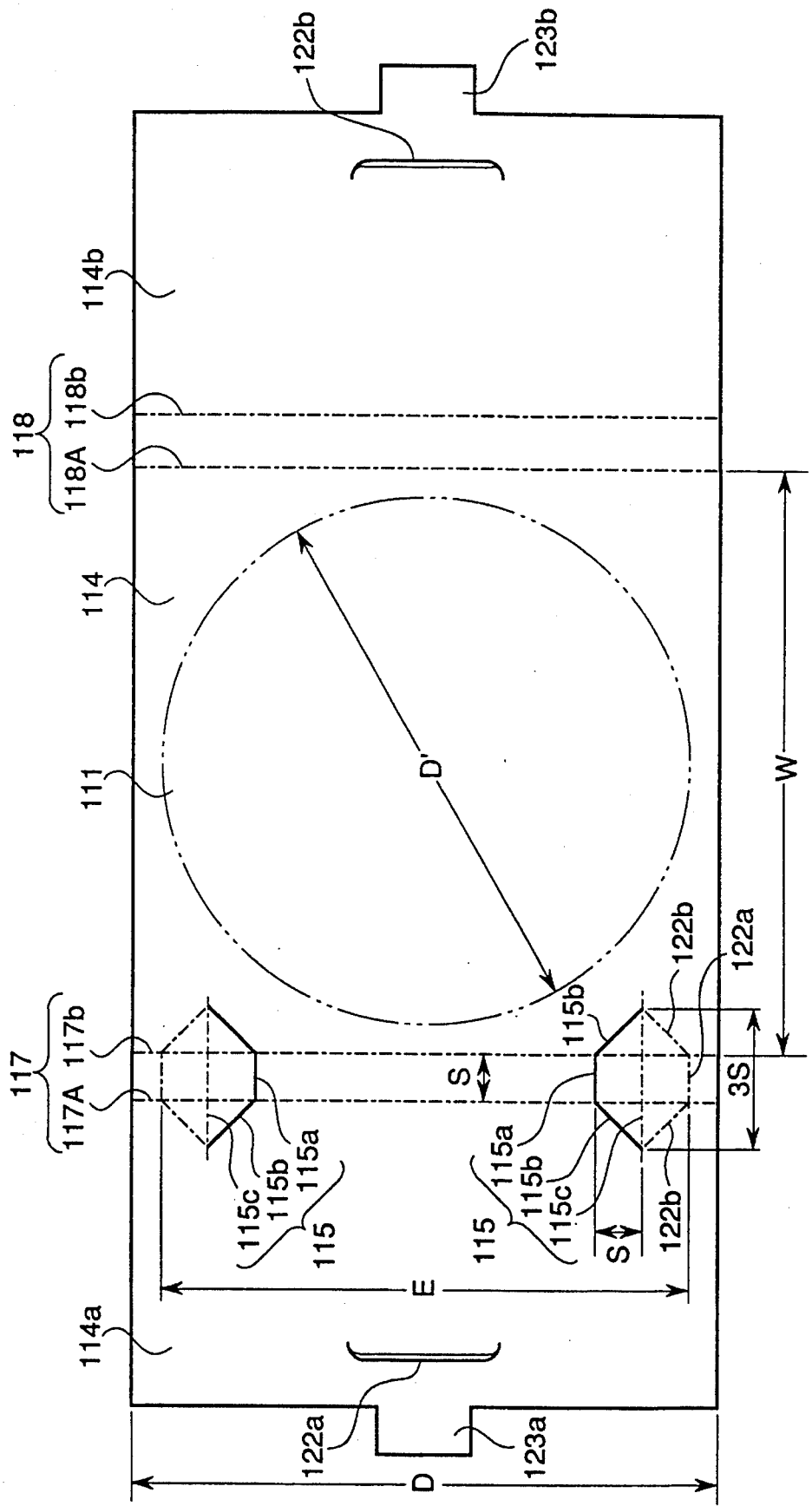
FIG. 5 is a development of an outer box used in the case shown in FIG. 4.
Figure 6:
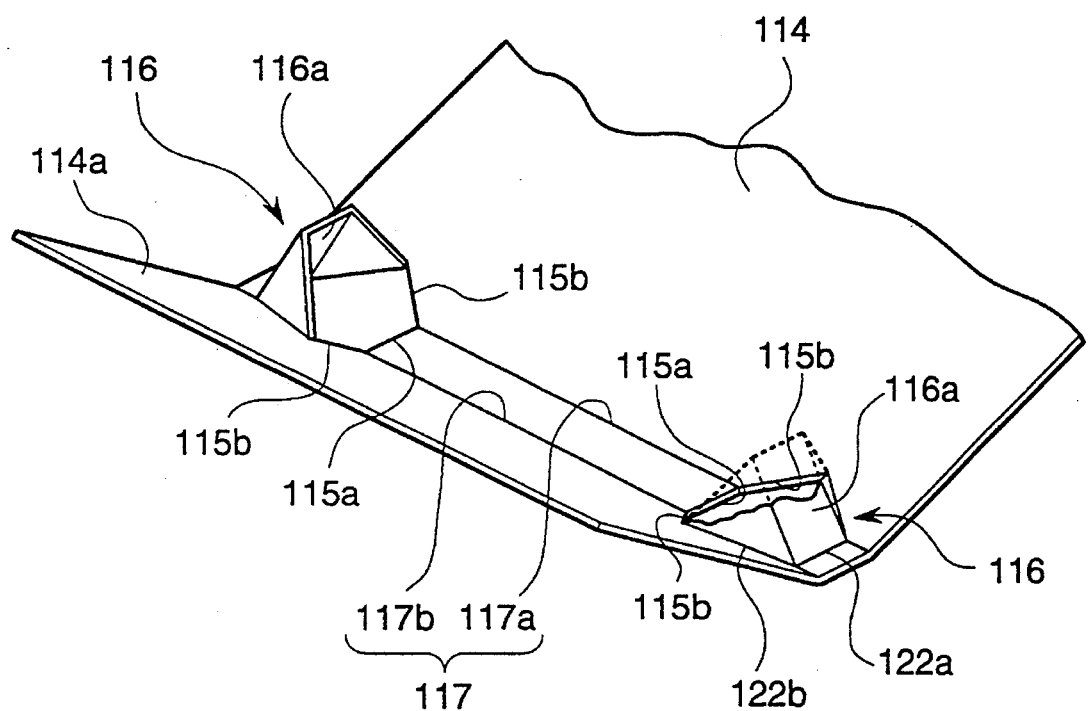
FIG. 6 is a perspective view of the outer box, illustrating a condition when opposite supporting pocket are lifted up.

The outer case 112 is prepared from a rectangular punched sheet 114 of thick paper whose development is shown in FIG. 5. How to fold the punched sheet 114 is shown in FIGS. 4 and 6. The rectangular punched sheet 114 has a central portion delimited by a transverse length "W" which is a little longer than a diameter "D'" of a disk 111 to be received. Opposite outside of the central portion are turned up inwards at respective creases 117a, 117b and 118a, 118b to form respective folded portions 117, 118 each having a nearly U-shaped cross section.

One of the folded portions (left side folded portion 117 in FIG. 5) has two cut lines 115, 115 spaced at a predetermined distance "E". As is shown in FIG. 6, two receiving pockets 116, 116 for receiving and supporting the inner case 113 therein are turned up from respective cut lines 115, 115.

As is shown in FIG. 5, each of two cut lines 115, 115 is a slit consisting of three cut lines corresponding to a top side 115a and two sides 115b except a bottom side 115c of a trapezoid. Two top sides 115a of two trapezoids are faced to each other. The top side 115a has nearly same height and length as a distance "S" spacing two creases of which the folded portion 117 is made and the bottom side 115c is three times longer than the distance "S".

Owing to this configuration, opposite receiving faces 116a, 116a of the receiving pockets 116, 116 can be turned up nearly perpendicularly with respect to a plane of the folded portion 117 when the receiving pockets 116, 116 are turn up at the cut lines 115, 115 and folded at creases 122a and 122b and the folded portion 117 is folded inwards to have a nearly U-shaped cross section as is shown in FIG. 6.

Figure 7:
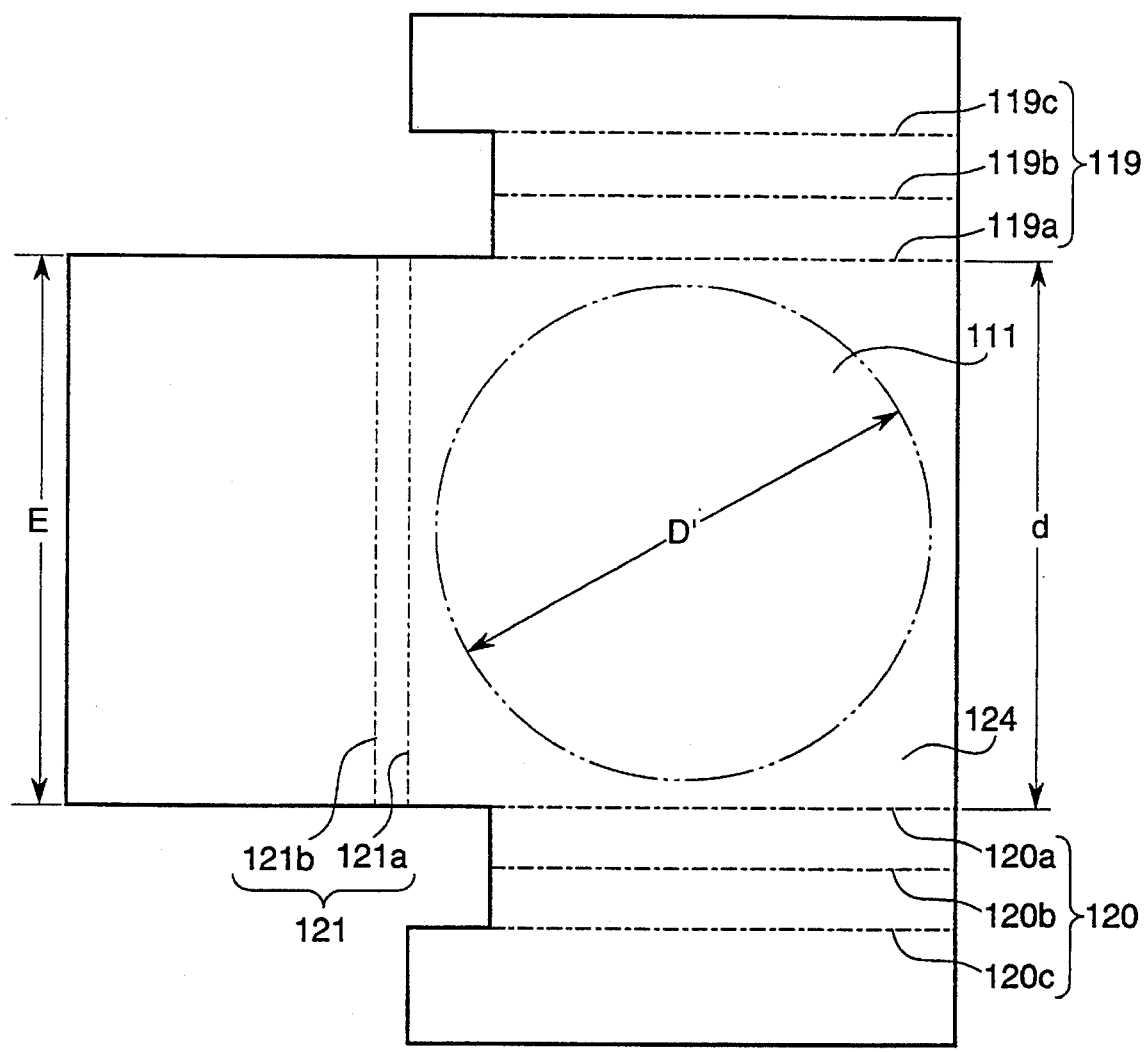
FIG. 7 is a development of an inner box used in the case shown in FIG. 4.
Figure 8:
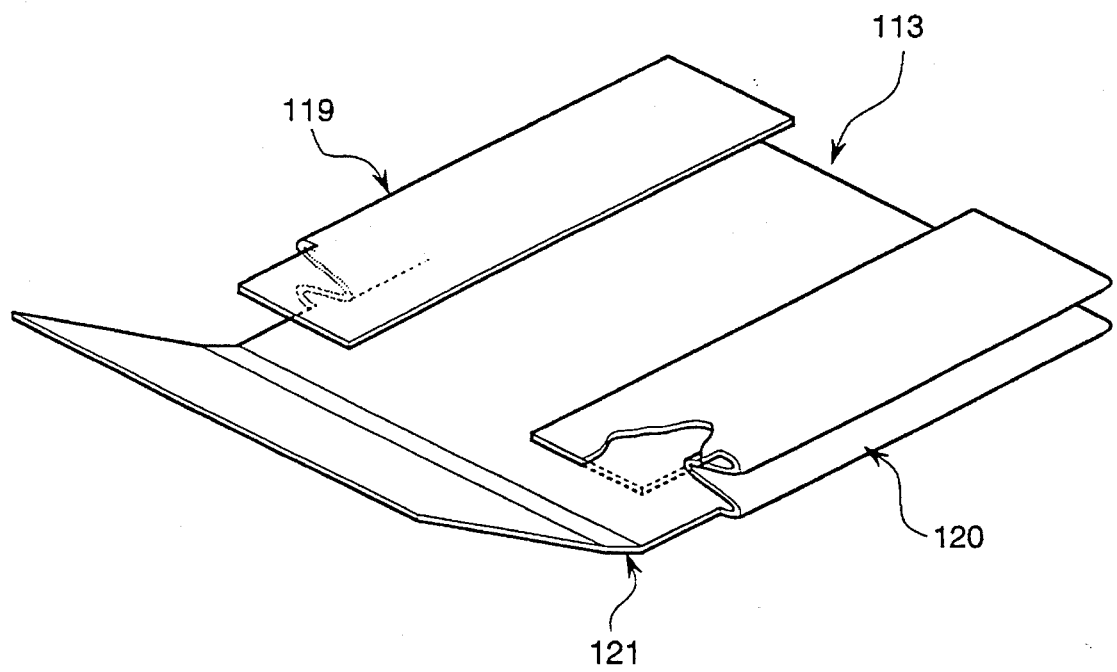
FIG. 8 is an illustrative perspective view of shaped inner box.

The inner box 113 is prepared from a punched sheet 124 whose development is shown in FIG. 7. How to fold the punched sheet 124 is shown in FIG. 8. The punched sheet 124 has a central portion delimited by a width "d" which is nearly equal to the diameter "D'" of the disk 111 to be contained. Opposite outsides of the central portion extend to respective bellows portions 119, 120 each being folded inwards at creases 119a, 119b, 119c and 120a, 120b, 120c so as to have a cross section of bellows. A left side of the punched sheet 124 is also folded inwards at two creases 121a and 121b which form a folded portion 121 having a nearly U-shaped cross section. The folded portion 121 has a width "E" which is equal to a distance between opposite receiving faces 116a, 116a of the receiving pockets 116, 116.

Owing to the above-mentioned configuration, insertion of the inner case 113 into an outer case 112 can be effected simply by inserting the folded portion 121 of the inner case 113 into a space between opposite receiving faces 116a, 116a of the receiving pockets 116, 116 while the folded portion 117 of the outer case 112 is deformed or folded into a nearly U-shaped cross section.

Figure 9:
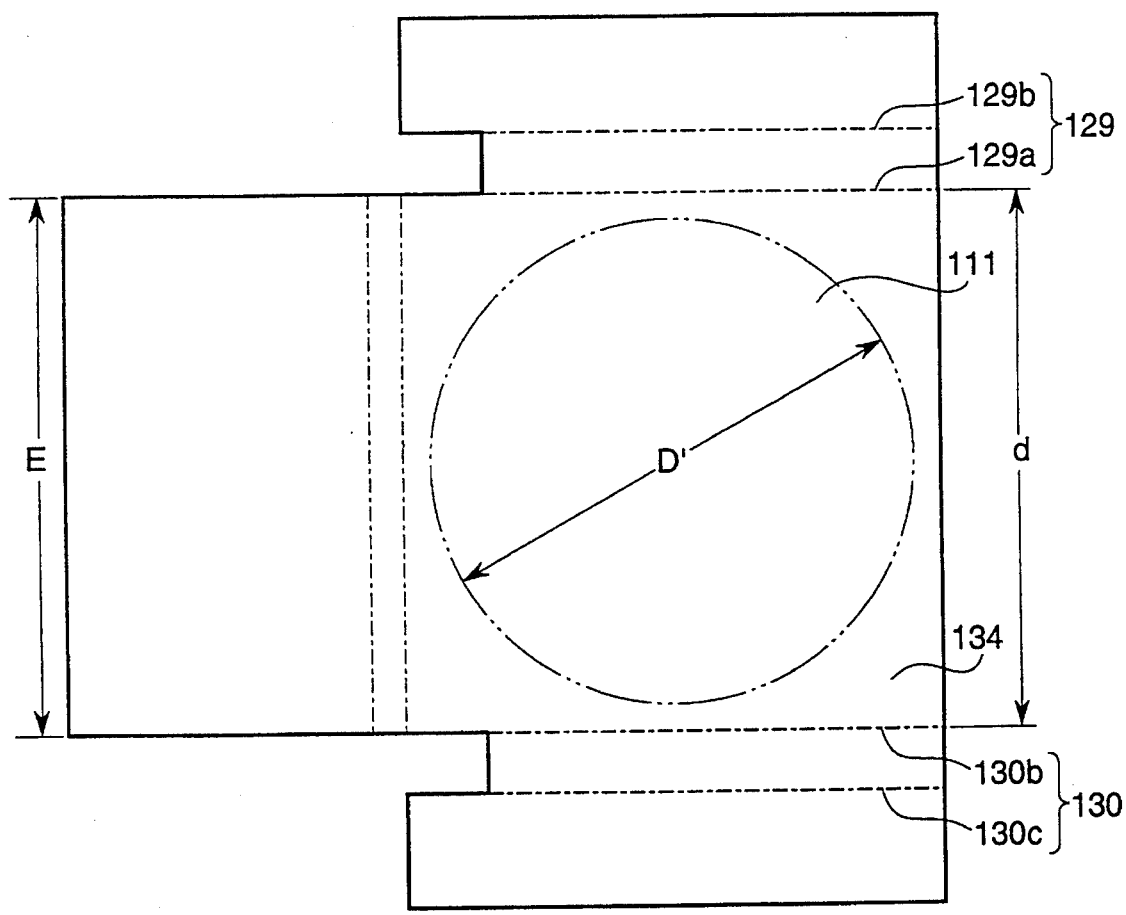
FIG. 9 shows a development of an inner box of another embodiment according to the present invention.

The inner case can have a development shown in FIG. 9. In this case, opposite wings of a punched sheet 134 are folded inwards at respective two creases 129a, 129b and 130a, 130b to form folded portions 129 and 130 each having a nearly U-shaped cross section, so that one disk can be stored between folded surfaces (bellows).

In this embodiment, each wing 114a, 114b of the outer case 112 has a slit 122a, 122b and an insert lip 123a, 123a as is shown in FIG. 5. The insert tongues 123a and 123b are inserted into the respective slits 122a and 122b after a disk 111 is stored in the case.

EXAMPLE 3

Figure 10:
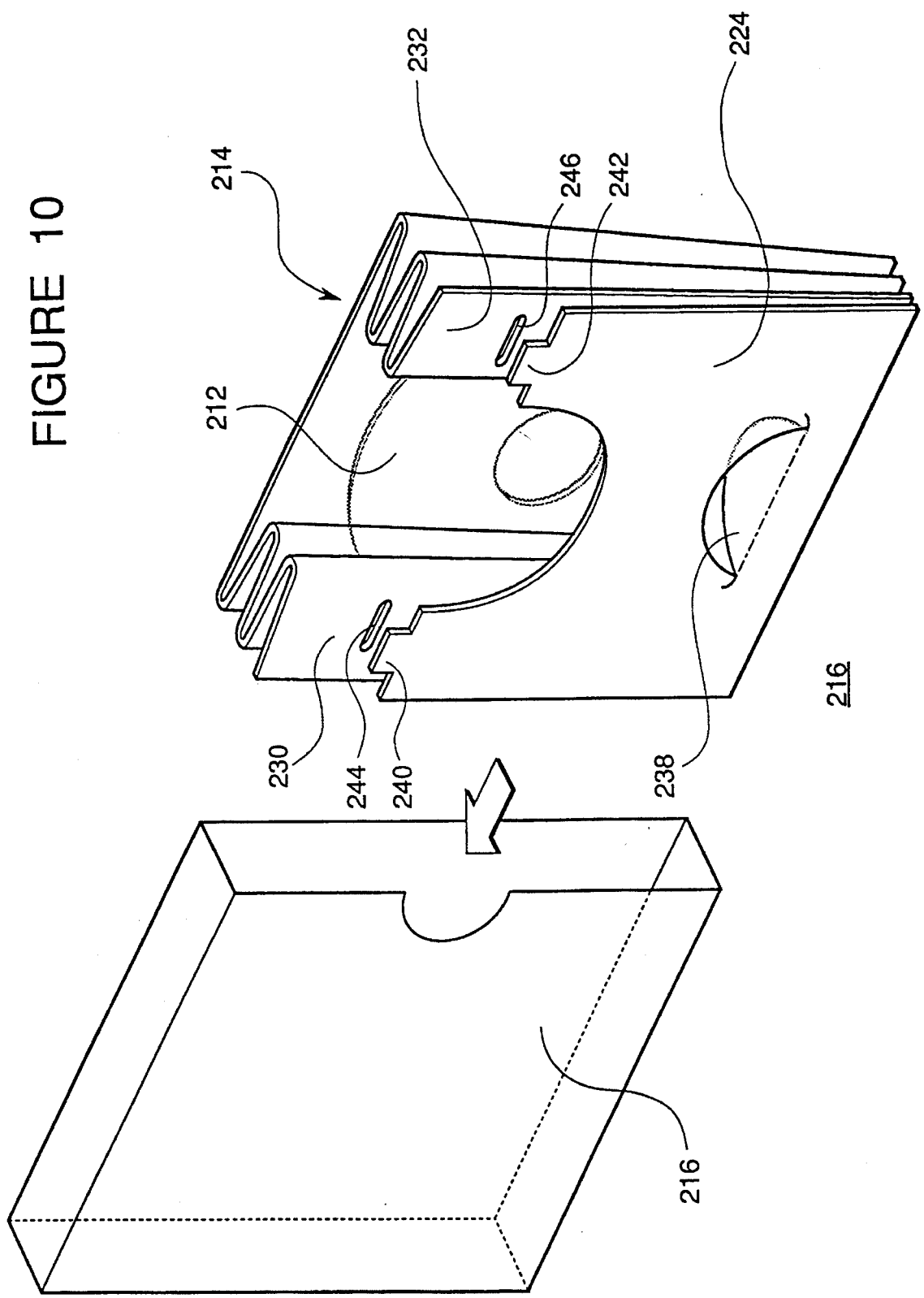
FIG. 10 is an illustrative perspective view of third embodiment of a case for disk-type recording medium according to the present invention.

FIG. 10 is an illustrative perspective view of third embodiment of a case 210 for receiving disk-type recording medium according to the present invention.

This case 210 for receiving disk-type recording medium consists of an inner case 214 for storing a recording medium 212 and an outer case 116 for receiving the inner case 214.

The outer case 216 has an opening at a side as is shown in FIG. 10. In a variation, the outer case 216 may have two openings at opposite sides. The inner case 214 and the outer case 216 are made of soft material such as thick paper.

The inner case 214 is prepared by folding a nearly T-shaped sheet punched out from a sheet of thick paper at creases. The inner case 214 consists of, in its development, a rectangular central portion 218, side wings 220, 222 extending left and right from the central portion 218 and a turn-up portion 224 extending downward from a side of the central portion 218.

Each of side wings 220, 222 is folded for four times at creases 226a to 226d; 228a to 228d to form bellows 230, 232 (FIG. 10). The turn-up portion 224 is folded inwards at creases 234a, 234b so as to cover the bellows 230, 232 (FIG. 10). The rum-up portion 224 has, at its top end, two tongue 240, 242 which are intended to be hooked in slits 244, 246 cut in the bellows 230, 232 (FIG. 11).

In a variation, the turn-up portion 224 can be pasted to the bellow 230, 232 without slits 244, 246.

Owing to the above-mentioned design, the bellows 230, 232 can be deformed elastically against external forces and hence each recording medium which is held between bellows 230, 232 is floated from the central portion 218 and hence is protected from damage and deformation caused by accidental forces.

Figure 11:
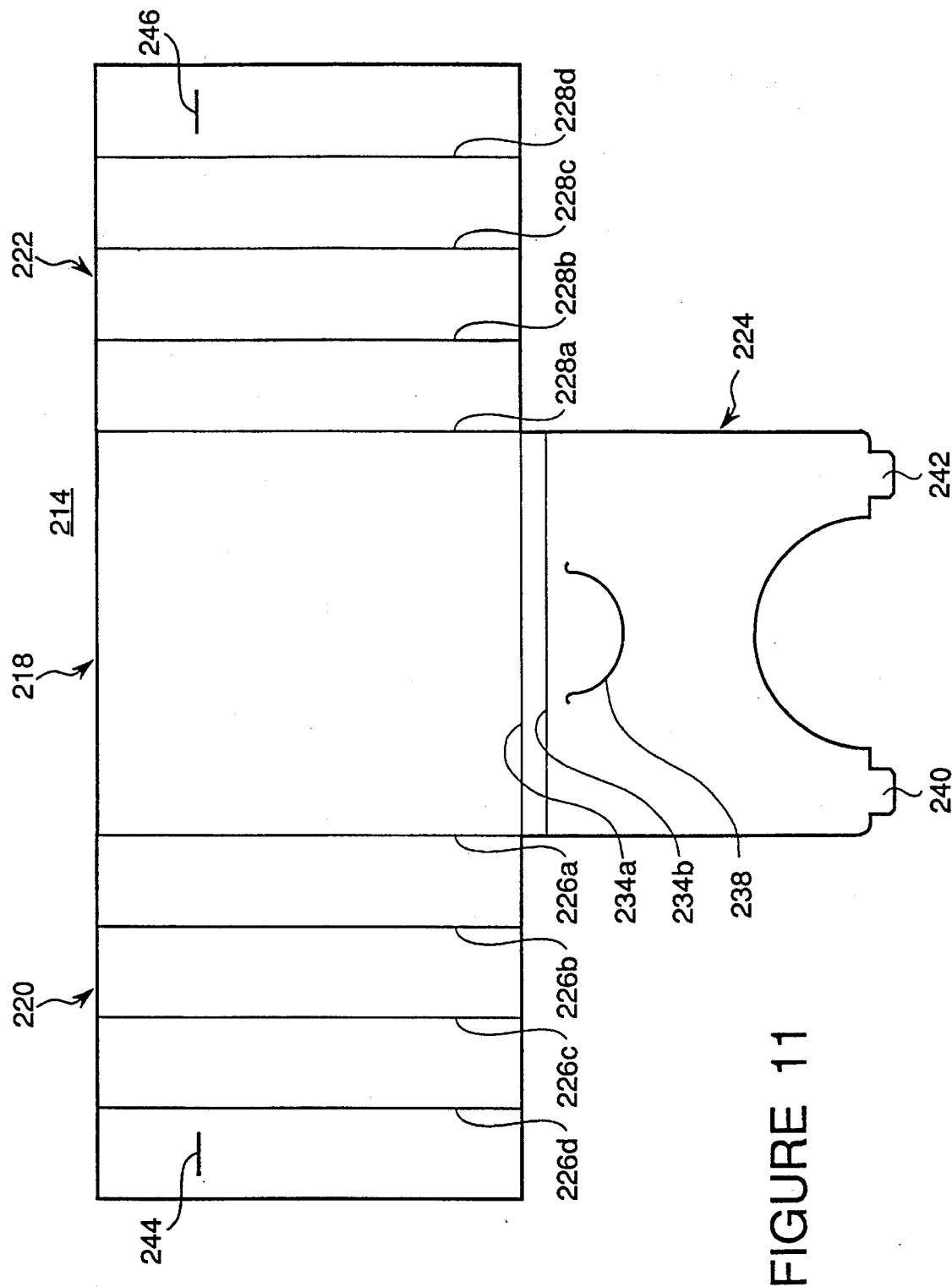
FIG. 11 is a development of an inner box used in the case shown in FIG. 10.

As is shown in FIGS. 10 and 11, the turn-up portion 224 has, near to its base, a cut line 236 along which a stopper 238 is turn up inwards. A edge of the recording medium 212 is abutted to the stopper 238, so that the recording medium 212 held between bellows 230, 232 does not move freely. In a variation, the stopper 238 may be turn up from the central portion 218.

Figure 12:
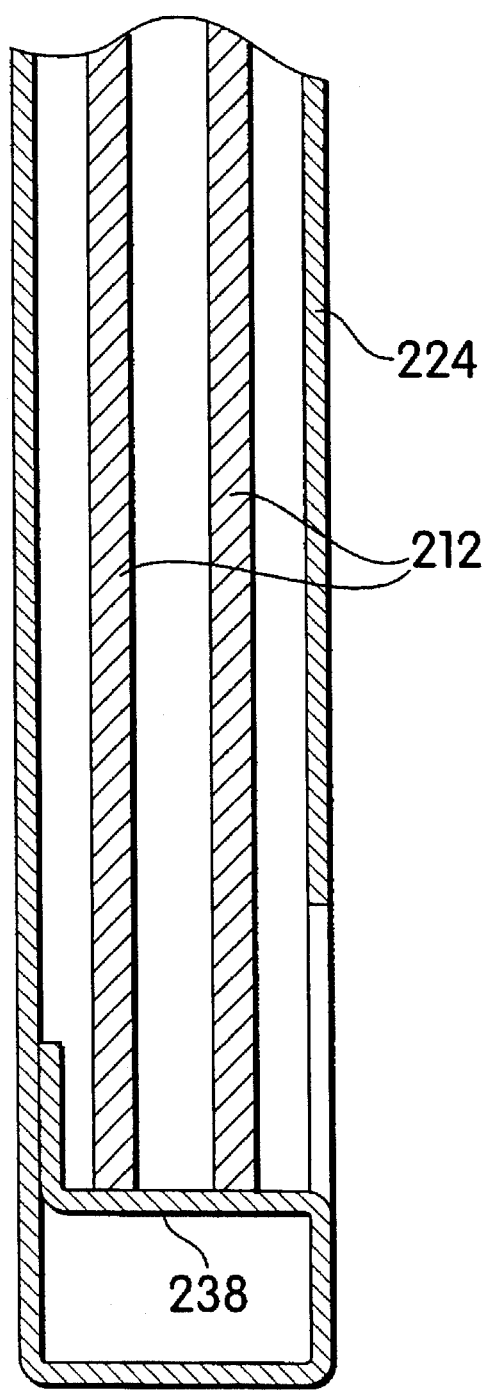
FIG. 12 and FIG. 13 are illustrative cross sectional views in the neighborhood of the stopper.
Figure 13:
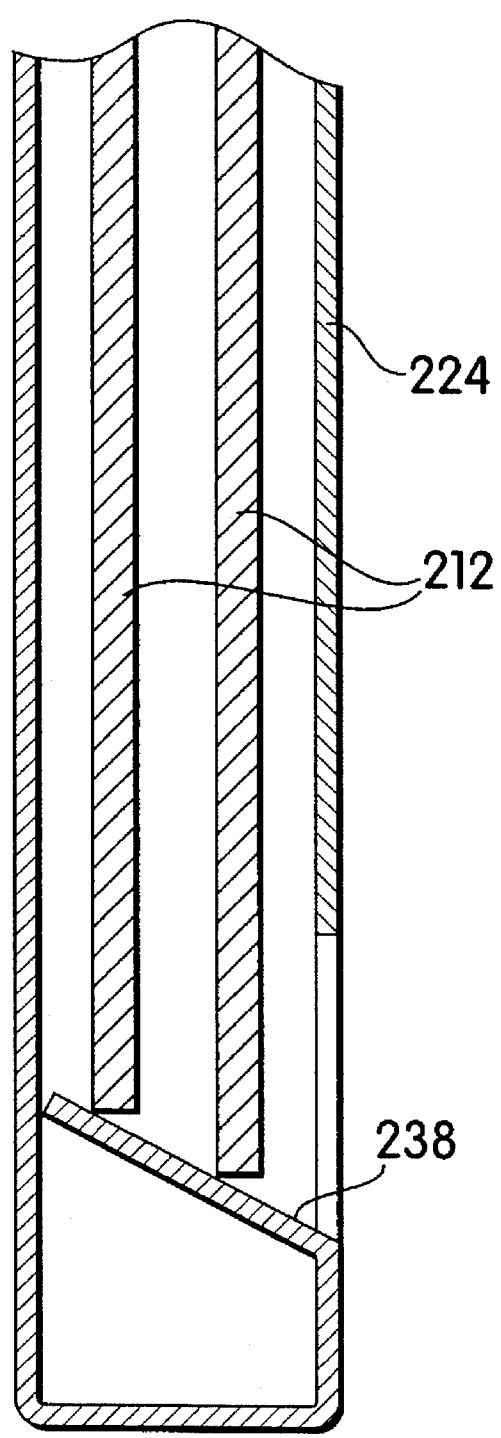

FIGS. 12 illustrates how the recording media 212 are abutted at their edges to the stopper 238. In FIG. 12, recording media 212 are abutted to a stopper 238 which is nearly vertical to the recording media 212. FIG. 5 illustrates a variation of recording media 212 which are abutted at their edges to a stopper 238 which is inclined to the recording media 212.

EXAMPLE 4

Figure 14:
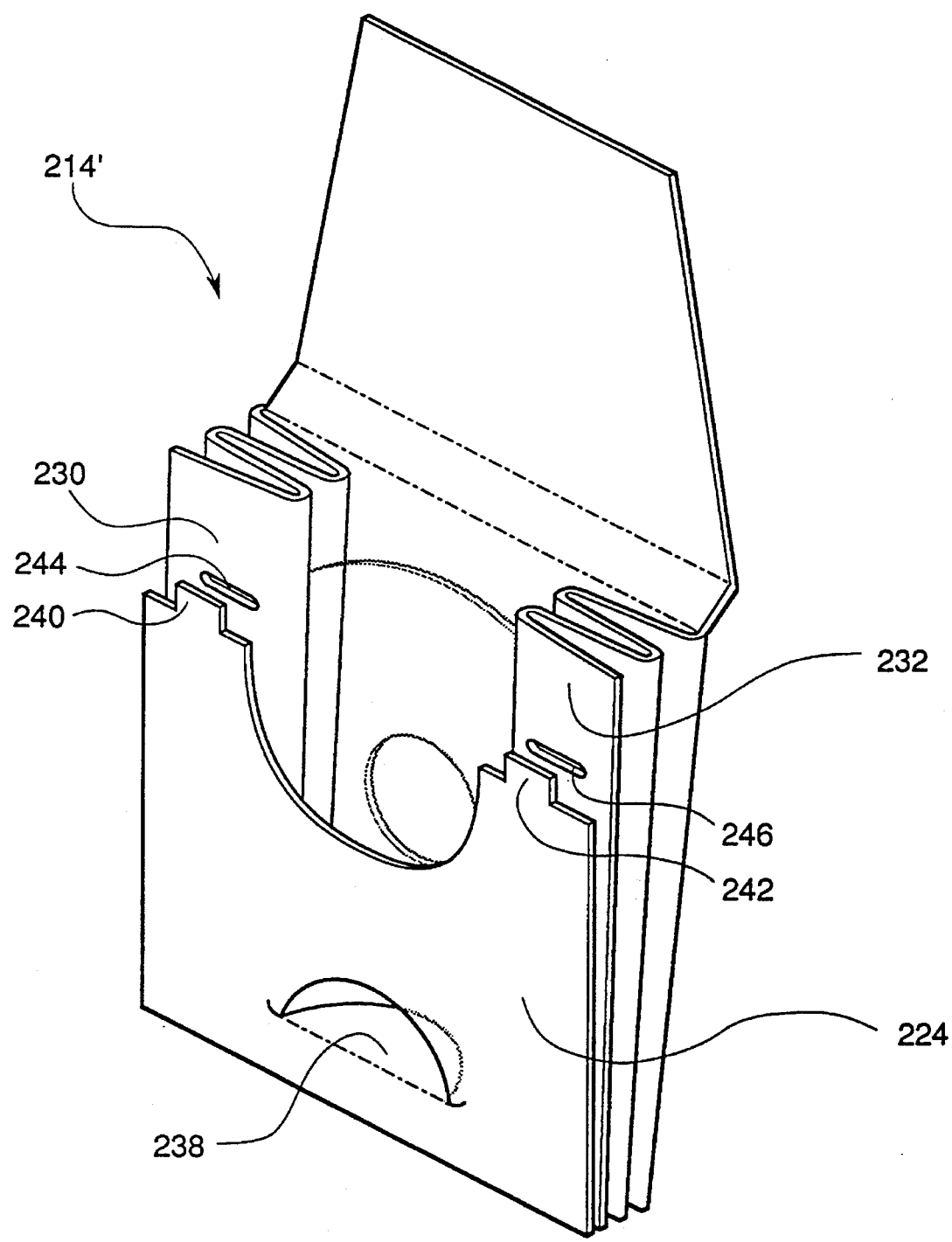
FIG. 14 is an illustrative perspective view of forth embodiment of a case for disk-type recording medium according to the present invention.

FIG. 14 illustrates a variation of the inner case 214 of FIG. 10. An inner case 214' of FIG. 14 has a lid 225 for closing an opening through which a recording medium 212 is inserted. This lid 225 has a width extending to all over opposite bellows 230 and 232 and is folded over the bellows 230 and 232 to protect the recording medium 212.

Figure 15:
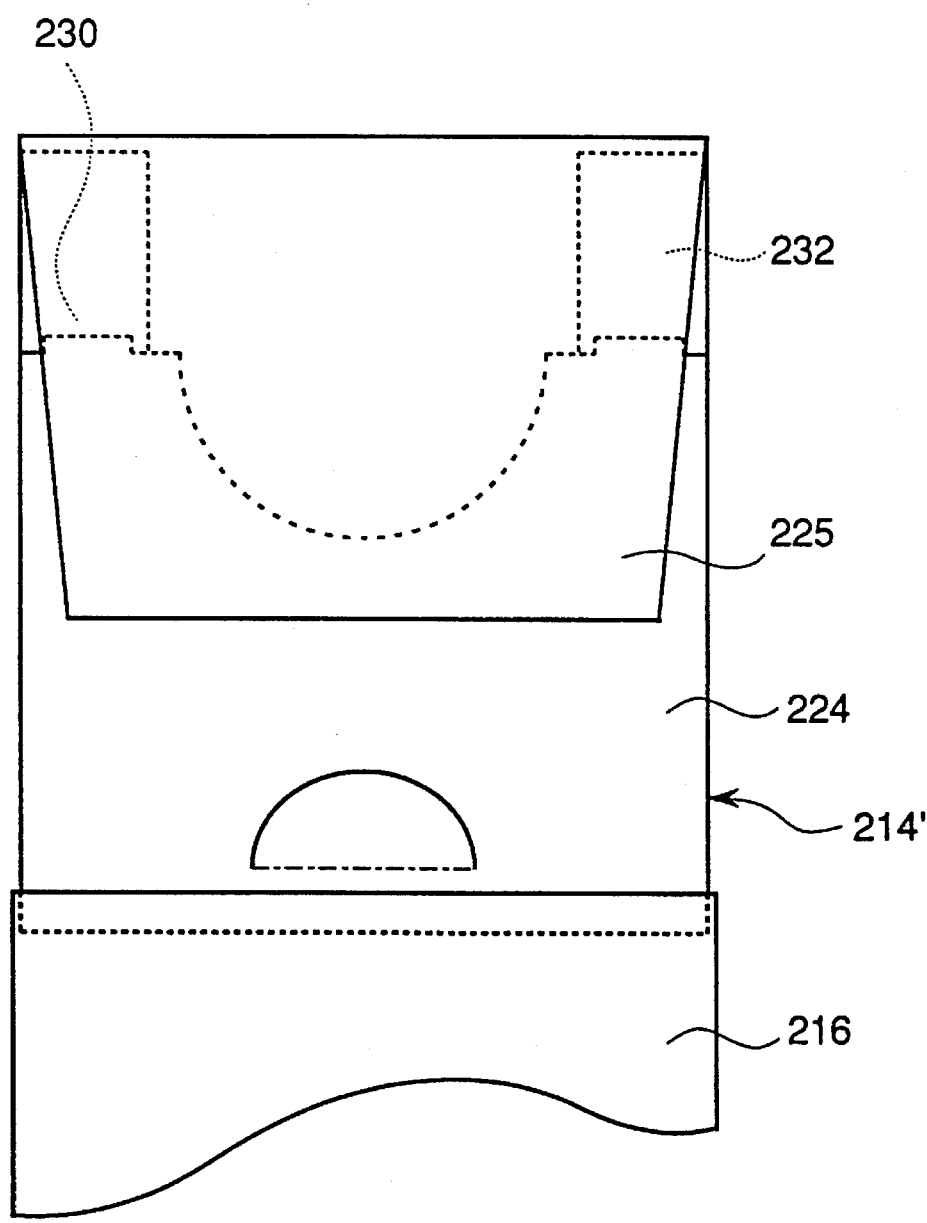
FIG. 15 illustrates how to insert an inner box into an outer in the disc case shown in FIG. 14.

When the inner case 214' is inserted into the outer case 216, the lid 225 is folded over the opposite bellows 230 and 232 and then is inserted into the outer case 216 as is shown in FIG. 15. Since the lid 225 covers and compresses expanding bellows 230 and 232 and hence free ends of the bellows 230 and 232 are not caught by the outer case 216 during insertion, the inner case 214' can be inserted smoothly and easily into the outer case 216.

The inner case 214' can reduce exposed area of the recording medium 212 owing to the lid 225 and hence reduces possibility of contact with the recording medium 212. The recording medium 212 is protected from hands at its all periphery due to the presence of the lid 225.

Figure 16:
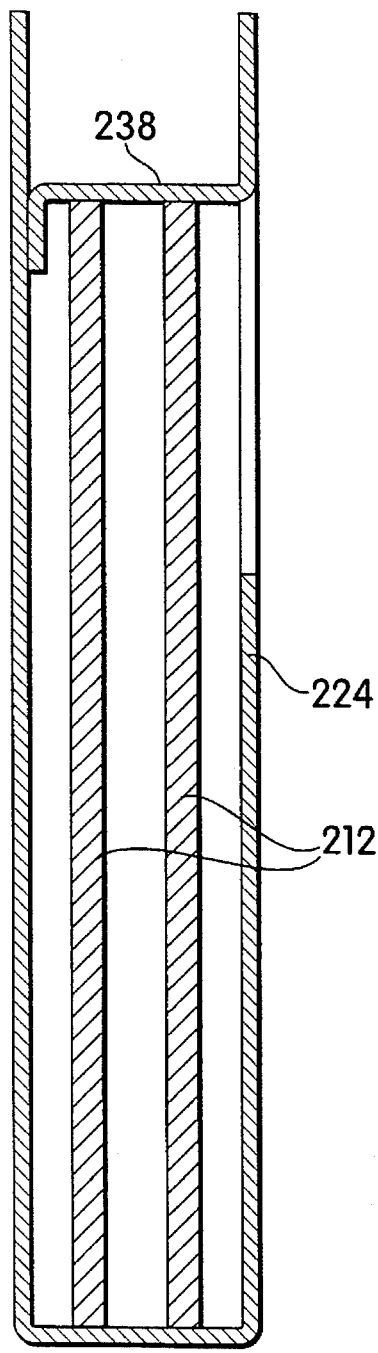
FIGS. 16 to 18 are illustrative cross sectional views in the neighborhood of the stopper.
Figure 17:
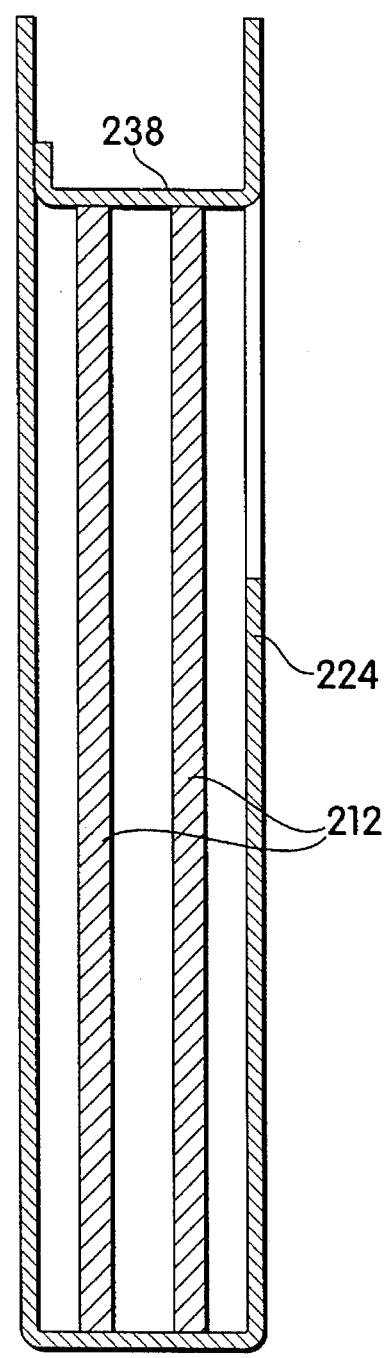
Figure 18:
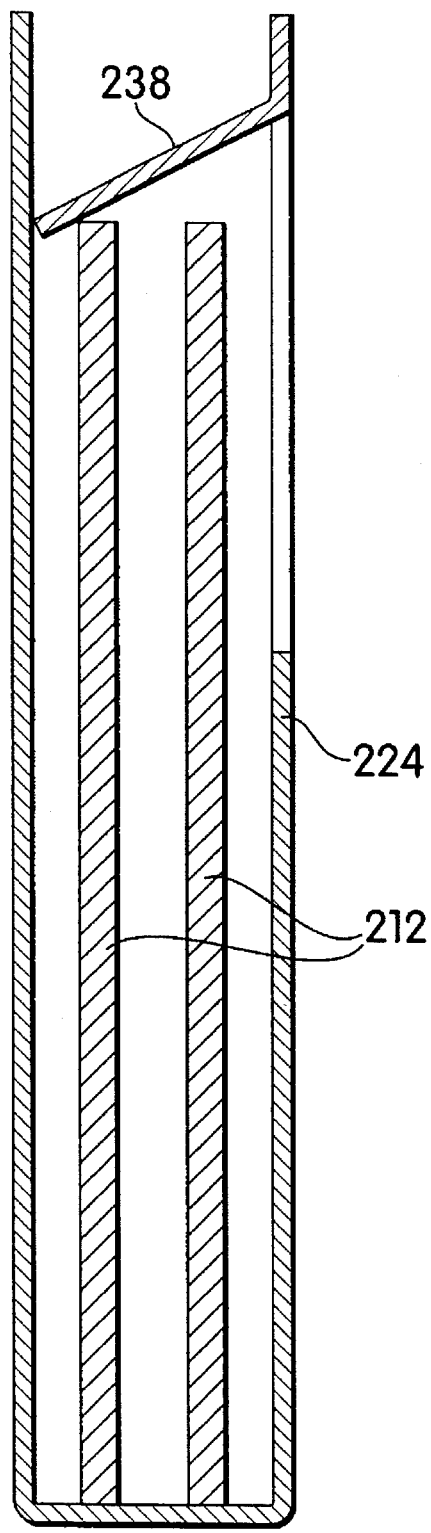

FIG. 16 is a cross section illustrating that the stopper 238 is formed near to the top end of the turn-up portion 224 so that a recording medium 212 abuts to the stopper 238. FIGS. 16 and 17 illustrates recording media 212 which are abutted to a stopper 238 which is nearly vertical to the recording media 212. FIG. 18 illustrates recording media 12 which are abutted at their edges to a stopper 238 which is inclined to the recording media 212. In the embodiment shown in FIGS. 16 to 19, the stopper 238 is folded inwards at 180° before the recording medium 212 is inserted and then is released onto an edge of the inserted recording medium 212 by elasticity of the stopper 238

EXAMPLE 5

Figure 19:
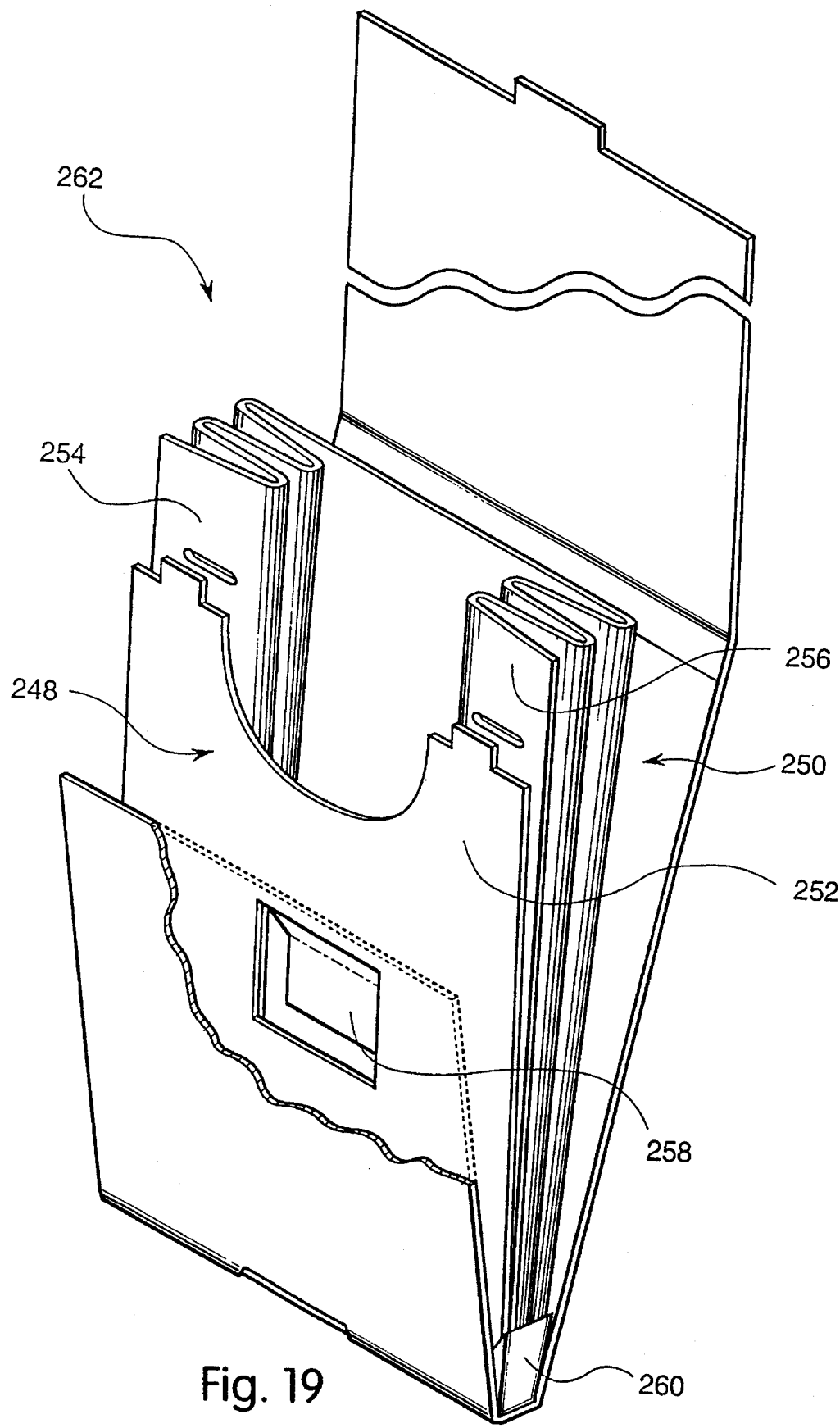
FIG. 19 is an illustrative perspective view of fifth embodiment of a case for disk-type recording medium according to the present invention.

FIG. 19 illustrates a case for a micro-compact disk (MCD) according to the present invention.

This disk case 262 also consists of an inner case 248 and an outer case 250 but is a longer height comparing to its width in order to protect from shoplifting in shops. Namely, the height of the disk case is extended intentionally in such a manner that the disk case projects out of a shoplifter's pocket so as not to facilitate shoplifting.

The inner case 248 has a turn-up portion 252 and bellows 254, 256 which are similar to those shown in Example 3. A stopper 258 is turned up inwards along a cut line formed at an intermediate part of the turn-up portion 252.

The outer case 250 is prepared by folding an elongated rectangular punched sheet at creases. Receiving pockets 260 are turn up at cut lines at one of folding portions, so that the inner case 248 is inserted and held between the receiving pockets 260.

Variations

FIGS. 20 to 24 are illustrative views of variations of Examples 1 to 4 and hence only differences from Examples 1 to 4 are described briefly.

Figure 20:
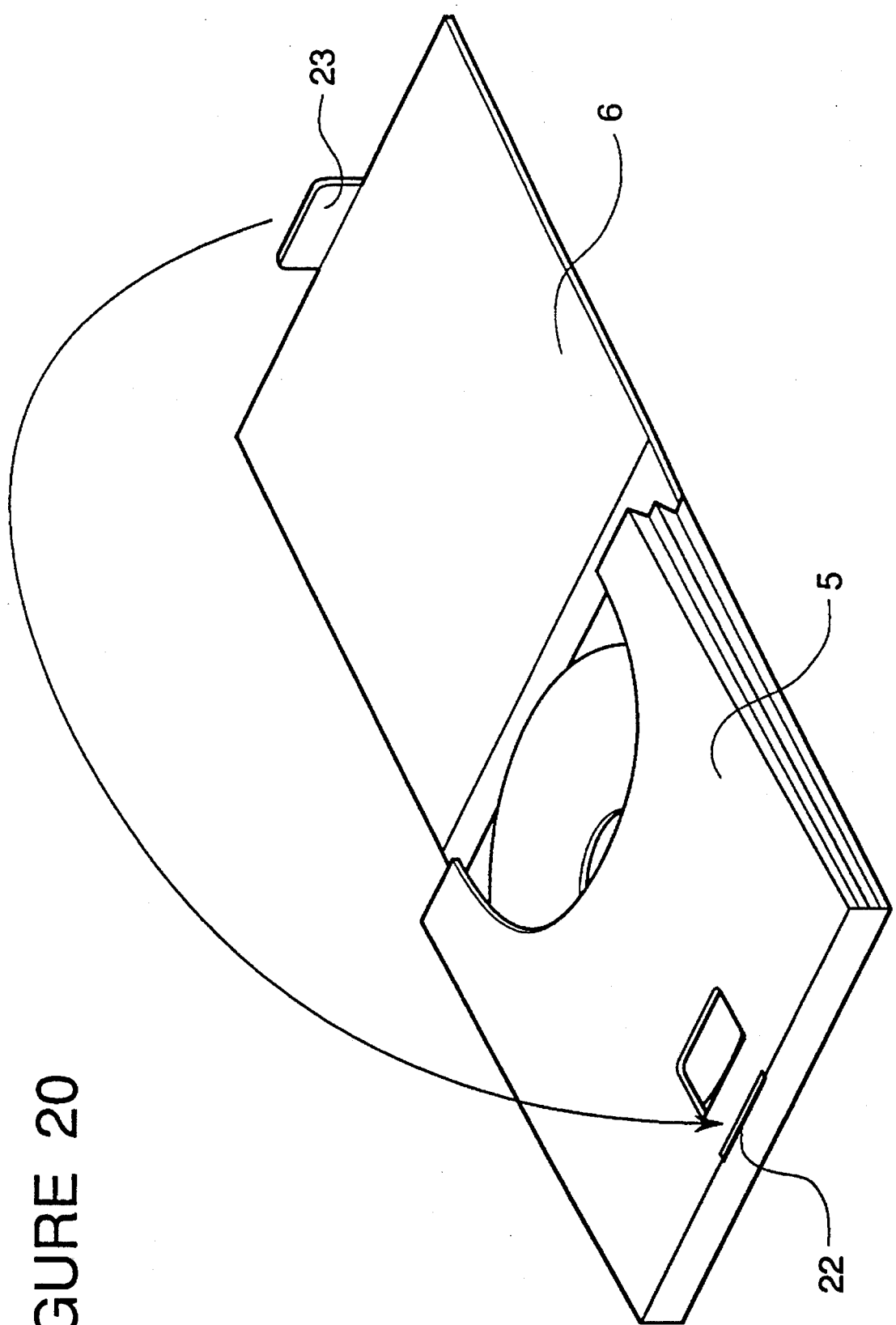
FIGS. 20 to 24 illustrate variations of disk cases according to the present invention.

FIG. 20 is a variation of Example 1 in which a disk case is prepared from a sheet of paper. In this variation, shapes of the lids 5 and 6 are modified and an upper lid 6 has a tongue 23 which is intended to be inserted to a slit 22 formed in the lower lid 5.

Figure 21:
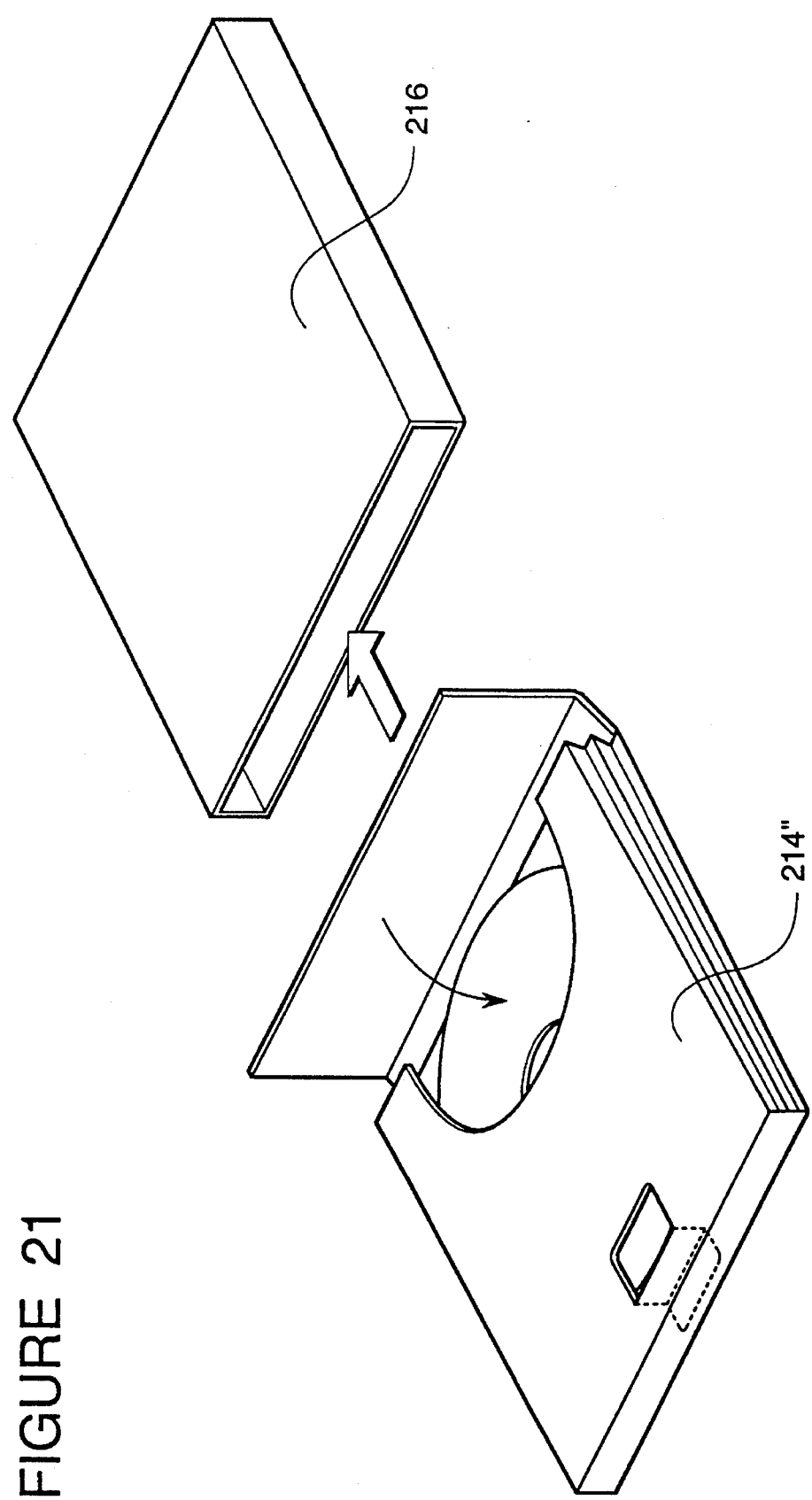

FIG. 21 illustrates a variation of Example 4. In this variation, the inner case 214" has a different shape and is inserted into an outer case 216 differently from Example 4.

Figure 22:
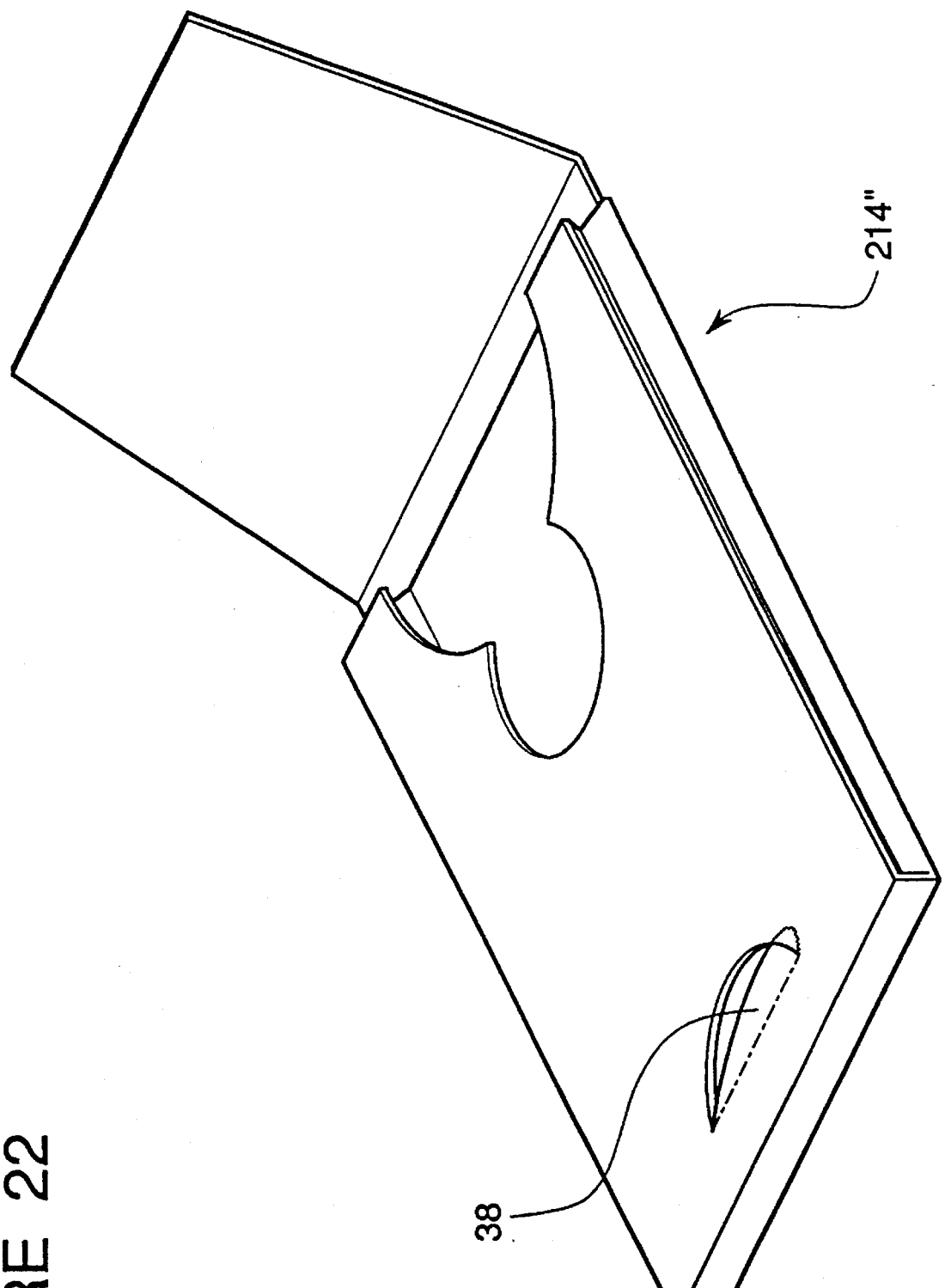

FIGS. 22 illustrates a variation of the inner case 214" shown in FIG. 21. In this variation, the inner case 214" has a different shape and a different stopper 38.

Figure 23:
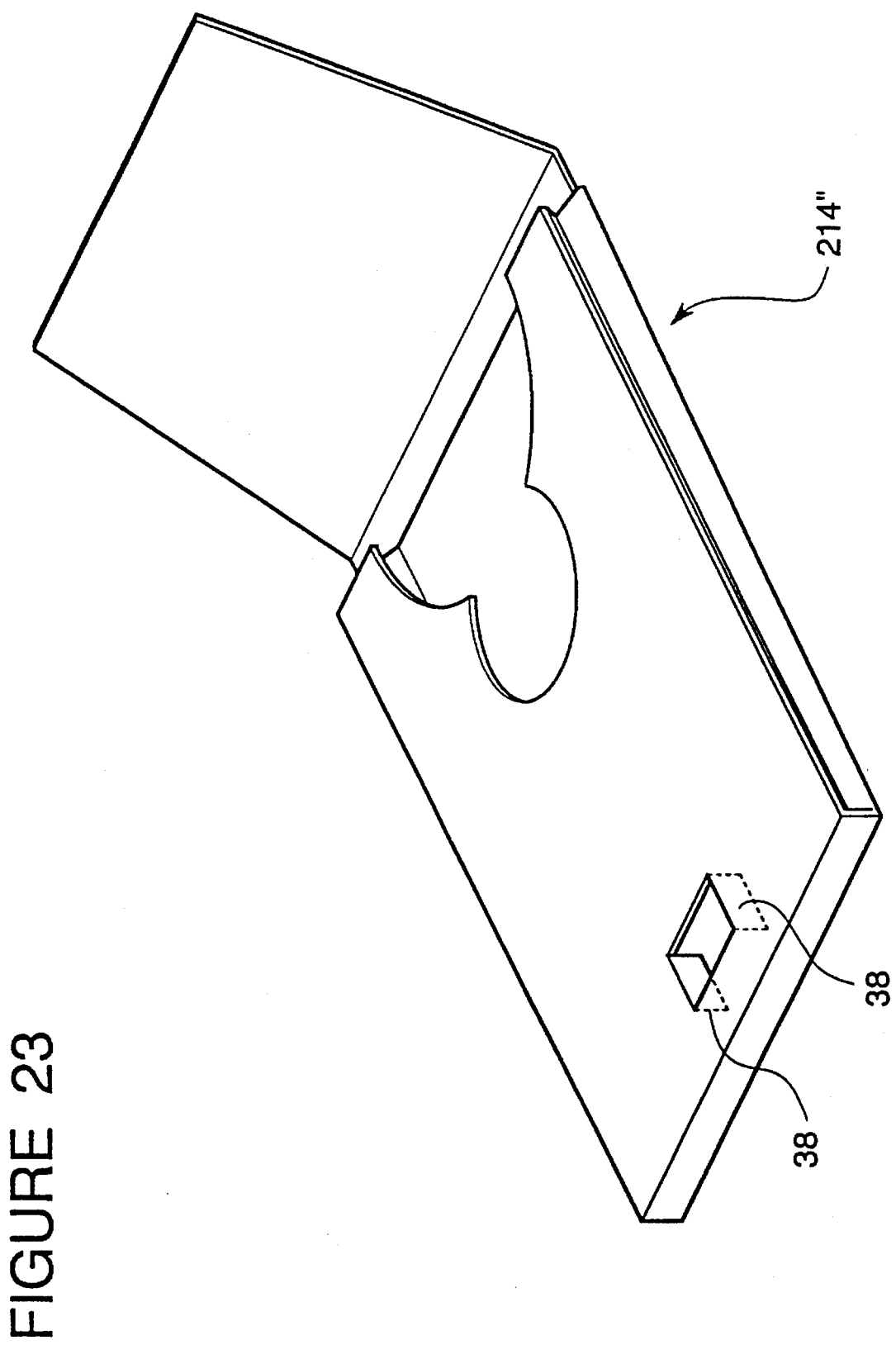

FIGS. 23 illustrates a variation of FIG. 22. In this variation, two stoppers 38 are turned up inwards.

Figure 24:
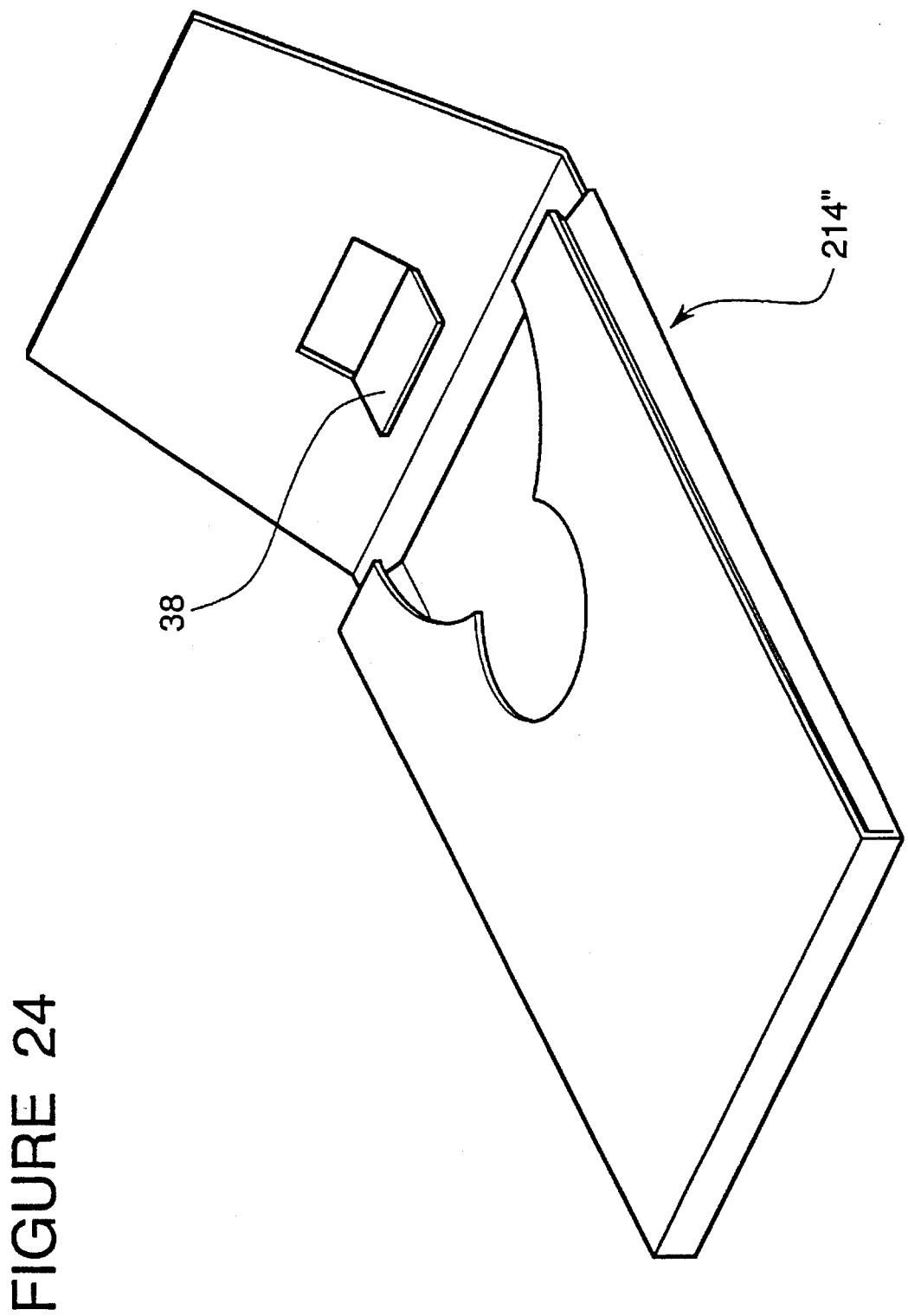

FIGS. 24 illustrates another variation of FIG. 22. In this variation, a stopper 38 is formed in an upper lid.

Figure 25:
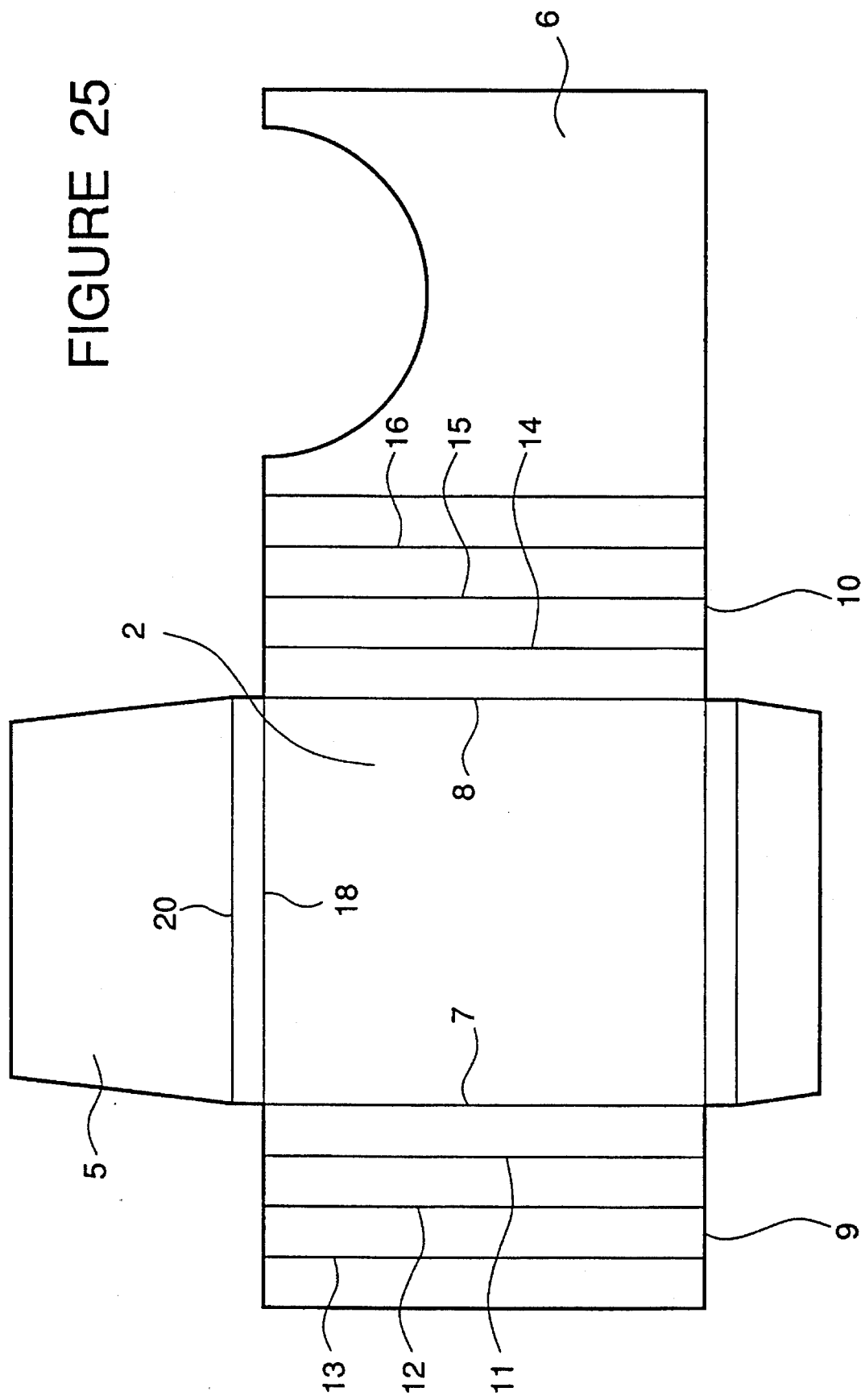

FIGS. 25 and 26 illustrate another variation of the present invention.

I claim:

1. A two piece case for receiving a disk-type recording medium, comprising:

a first piece comprising an inner case having a pair of four-sided planar surfaces disposed face-to-face;

first and second sides disposed on opposite sides of said planar surfaces, said first and second sides being folded along a plurality of creases to form a bellows for supporting said disk-type recording medium;

a third side which folds over the bellows thereby forming a top to the inner case and a flap facing said inner chamber;

a fourth side forming a bottom to the inner case; and an outer case dimensioned to receive said inner case.

2. The case of claim 1 wherein a stopper is formed by folding inward a portion of the bottom so that when the recording medium is inserted into the case it is abutted at an edge by the stopper such that it is held firmly in place.

3. The case of claim 1 wherein printed matter is inserted in a valley of the bellows.

* * * * *